United States Patent
Aas et al.

(10) Patent No.: US 6,646,244 B2
(45) Date of Patent: Nov. 11, 2003

(54) OPTICAL IMAGING DEVICE WITH SPEED VARIABLE ILLUMINATION

(75) Inventors: Eric Aas, Windsor, CO (US); Gordon R. Nuttall, Fort Collins, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 36 days.

(21) Appl. No.: 10/027,747

(22) Filed: Dec. 19, 2001

(65) Prior Publication Data

US 2003/0111589 A1 Jun. 19, 2003

(51) Int. Cl.[7] .................................................. G01J 1/32
(52) U.S. Cl. ...................... 250/205; 250/208.1; 358/474
(58) Field of Search .............................. 250/208.1, 216, 250/205–206.1, 239, 227.26, 227.28–227.29, 234–236, 556, 566, 559.42–559.44, 559.4; 385/136; 358/505, 524, 474, 480, 482, 488, 496, 475; 355/41, 67–68, 84; 359/200–201, 298, 310, 315, 318; 382/112, 116–117, 162–167

(56) References Cited

U.S. PATENT DOCUMENTS

| | | | | |
|---|---|---|---|---|
| 3,998,547 A | * | 12/1976 | Schroter et al. | 355/68 |
| 5,381,020 A | * | 1/1995 | Kochis et al. | 250/566 |
| 5,578,813 A | | 11/1996 | Allen et al. | 250/208.1 |
| 5,870,203 A | * | 2/1999 | Chiu et al. | 356/430 |
| 5,994,710 A | * | 11/1999 | Knee et al. | 250/557 |
| 6,355,937 B2 | * | 3/2002 | Antonelli et al. | 250/556 |

* cited by examiner

*Primary Examiner*—David Porta
*Assistant Examiner*—Patrick J. Lee (57) ABSTRACT

The invention discloses a system and method for an optical imaging device comprising an image sensor for reading image data from an original slid over the image sensor, a variable power interface for varying an intensity of an illumination source corresponding to the image sensor, wherein the intensity is varied responsive to velocities of the original slid over the image sensor, and a processor for processing the image data.

23 Claims, 4 Drawing Sheets

OPTICAL IMAGING DEVICE WITH SPEED VARIABLE ILLUMINATION

BACKGROUND OF THE INVENTION

1. Technical Field

The present invention related generally to imaging devices and, more particularly, to optical imaging devices with speed variable illumination.

2. Background

Optical imaging devices for electronically forming an image of an original are known. Optical imaging devices generally capture the image of an original and create an electronic representation of that image. Optical imaging devices typically comprise scanners, whether implemented in a scanner product, or whether incorporated into other appliances and products such as copiers, facsimile machines, multi-function devices, and the like.

Typically, the captured image provided by a scanner is a pixel data array that is stored in memory in a digital format. A distortion-free image requires a faithful mapping of the original image to the pixel data array. Scanners typically include at least one means for imposing a mechanical constraint during the image capture process in order to maximize the likelihood of faithful mapping.

The five types of scanners generally known in the art are drum scanners, flatbed scanners, sheet fed scanners, two-dimensional array scanners, and hand scanners. Drum scanners attach the original to the surface of a cylindrical drum that rotates at a substantially fixed velocity. During the rotation of the drum, an image sensor is moved in a direction parallel to the rotational axis of the drum. The combination of the linear displacement of the image sensor and the rotation of the original on the drum allows the entire original to be scanned. At any moment during the imaging process, the current position within the pixel data array relative to the original can be determined by measuring the angular position of the drum and the translational position of the sensor. The position of the pixel data array with respect to the original is fixed as long as the original is properly attached to the drum, the drum rotation is properly controlled, and the sensor is properly controlled in its displacement along the linear path.

Flatbed scanners include a linear array sensor that is moved relative to the original along an axis that is perpendicular to the axis of the array. Thus, the position of the sensor in one dimension may be known by tracking the relative movement of the sensor. The position of the sensor in the perpendicular direction is implicitly fixed by addressing a particular array element at which intensity is to be measured. In operation of a typical flatbed scanner, the original is placed on a transparent platen and the sensor, along with an image illumination source, is placed on a side of the platen opposite to the original. As long as the original is not moved relative to the platen, the pixel data array will be fixed with respect to the image to be captured.

Sheet fed scanners perform scanning by moving the original rather than moving the sensor. Precision paper transports provide a high degree of positional accuracy for the original during the image-capture process. The paper transports move the original over the stationary sensors to optoelectronically capture the image of the original. Such sheet fed scanning processes may be found in many types of facsimile machines.

Advantages of the drum, flatbed, and sheet fed scanners include the ability to accommodate documents at least as large as A4, or 8.5"×11" paper. Moreover, some of these scanners can handle A1 paper in a single setup. However, these scanners are not generally portable, since they require a host computer for control, data storage, and image manipulation.

Two-dimensional array scanners may be used in the absence of mechanical encoding constraints, and require only that the array and the original be held motionless during an exposure period. A two-dimensional array of photosensitive elements directly accomplishes the mapping of the image of the original into a pixel data array. However, because a single 300 dpi mapping of an 8.5"×11" original requires an image sensor having an array of 2500×3300 elements, i.e. 8.25 million pixels, these scanners are cost-prohibitive in most applications.

Conventional hand scanners require a user to move a linear array of electrooptical sensor elements over an original. The movement is performed and controlled by hand manipulation. Array-position information is determined using methods such as those employed in operation of a computer "mouse." As a linear sensor array is moved, the rotation of wheels, balls, or rollers that are in contact with the original is sensed, and the position information is determined from the mechanical details of the rotation. Some hand scanners now use additional navigational sensors instead of the mechanical means in order to sense and determine the details of the positional information (e.g., motion and rotation). When used in conjunction with stitching algorithms, the positional information allows hand scanners to handle larger-sized documents in multiple-passes. Stitching algorithms allow the hand scanner to join together multiple swaths of a larger document. Hand scanners are typically connected directly to a personal computer for image data storage, processing, and use. The stitching performed by these types of hand scanners is usually processed in the personal computer.

Another trait to consider with hand scanners, is the data rates available for the scanner technology. Data rates from the image sensor tend to limit the scanning speed. The scanners provide feedback to the user, typically by means of green or red light emitting diodes, to maintain the appropriate speed for the desired image resolution. Some hand scanners use electromagnetic brakes to prevent the user from dragging the scanner over the image too rapidly, or provide a mechanical element to add resistance against the original that increases with increases in scanning speed.

In many embodiments of hand scanners, the surface of the mechanical element in contact with the original has a high coefficient of friction, e.g. rubber, so as to resist slip and skid. A cylindrical roller or certain number of wheels connected by a rigid axle may be used to encourage a single translational degree of freedom during the scanning process. A straight-edge or other fixture is sometimes used to restrict the scan direction with respect to the original and to further encourage the translational constraint provided by the wheels or roller. Nevertheless, the position encoder approach (i.e., the sensing and determination of the details of the positional information, such as motion and rotation) is one that is often susceptible to slips and skips, so that the pixel data array loses its correspondence with the image on the original.

Although many hand scanners connect in some fashion to a personal computer for performing some of the processing, one hand scanner disclosed in U.S. Pat. No. 5,578,813, the disclosure of which is incorporated herein by reference, performs all processing and stitching completely within the scanner unit. In this disclosed embodiment of a hand scanner, two navigational sensors are generally used to detect motion in both x- and y-axes directions. Additional algorithms are also defined to compensate for any rotation that may naturally occur when the user is moving the scanner across an original. There is a tendency to impose some rotation as the hand scanner is moved across an original because of the natural positioning of the elbow as a pivot point. The rotation is likely to have a radius defined by the distance between the scanner and this elbow pivot point. As a consequence, the scanned electronic image would typically be distorted if not for the additional compensating algorithms.

BRIEF SUMMARY OF THE INVENTION

The present invention is directed to a system and method for an optical imaging device comprising an image sensor for reading image data from an original slid over the image sensor, a variable power interface for varying an intensity of an illumination source corresponding to the image sensor, wherein the intensity is varied responsive to velocities of the original slid over the image sensor, and a processor for processing the image data.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

A preferred embodiment of the present invention provides optical imaging with a device having an image sensor for reading image data from an original slid over the image sensor. A motion detector is preferably included to calculate the velocities of the original as it is slid over the image sensor. The device preferably uses the velocities not only to set the sensitivity or exposure timing of the image sensor, but also to vary the intensity of the illumination sources to compensate for the varying exposure rates. The optical imaging device also preferably has a processor for processing the image data into one or more image formats, and a memory for electronically storing the processed image data. All of the elements of the imaging device may be retained within a framework of metal, plastic, or other such material to hold the sensors, lenses, processors, and other components in place.

According to the present invention, the light sources used must be capable of providing a controllable, variable light intensity. As such, the inventive system may implement its light sources by using lights, such as light emitting diodes (LEDs), incandescent light, fluorescent lights, and the like. Such types of light sources may be controlled using current, voltage, or other types controls to vary the power provided to the light sources.

When a user desires to capture the image of an original, the original is placed against the device in such a manner as to cover the motion detector. As the motion detector is covered, the device and its image sensor are preferably activated and prepared for capturing the image of the original. The user would then preferably begin sliding the original across the face of the device. Alternatively, mechanical motion means may be used to slide or swipe the original across the face of the device. Such mechanical motion means may include stepper or servo motors, belt or cable drives, leadscrew or rack and pinion drives, or other such mechanical drives.

The motion detector preferably captures movement data through the detection of grain or image features of the original. Using this captured movement data, the motion detector preferably calculates the velocity or speed of the original. In the alternative embodiments using mechanical motion means, such means may have encoders, tachometers, or the like built-in to directly capture the velocity data from the mechanical motion means. In the manual motion embodiment, the device preferably uses the calculated velocity to set the sampling rate or exposure timing of the image sensor as well as the intensity of the light source. As the velocity of the original changes, the motion detector continues to re-calculate the velocity. The re-calculated velocities cause corresponding changes in the sampling rate and illumination intensity of the image sensor and its light source. This continual variation process preferably allows the device to maintain a constant or near-constant resolution through variations in velocity or speed of the original, up to some definite maximum or minimum intensity available to the light source.

The variable light source for the image sensor allows the scanner to maintain adequate conditions for the scanning resolution. The variation of the intensity may be implemented through a voltage or current-controlled light source. As the exposure time is shortened, more light is usually required to accurately image the data. Conversely, as the exposure time is lengthened, less light is generally required for accurate imaging.

The image-capturing process continues until the end of the original completely passes over the image sensor. The preferred embodiment of the present invention may accomplish this by preferably calculating an estimated time for the edge of the original to pass from the motion detector to the end of the image sensor. The device would preferably use the last calculated velocity to determine this timing.

Alternatively, a second motion detector set in-line with the first motion detector, but on the other side of the image sensor, may also be used to maintain the velocity calculations until the original completely passes over the image sensor. Using this alternative embodiment, the inventive system more accurately images the original by using the actual velocity calculations. Furthermore, when the original passes over the image sensor completely, the system would preferably cease imaging.

Once the copying procedure stops, the device processes the image data or pixels into an image format. In the preferred embodiment of the present invention, the device may preferably be able to process the raw image data into a selected number of different image formats. The different formats may preferably be chosen by a user either before or after the copying process. The resulting copied image may then preferably be stored into a memory on the device and/or transmitted to another attached or electronically-connected device or computer.

The preferred embodiment of the present invention incorporates a linear optical sensor, such as a contact image sensor (CIS), for creating image data. Another optical sensor is preferably used for tracking the presence and speed of the scanned object. The preferred system will also include an input/output (I/O) port, image storage media (resident, removable, or both), and a system and support circuitry for the two optical sensors.

Figure 1:
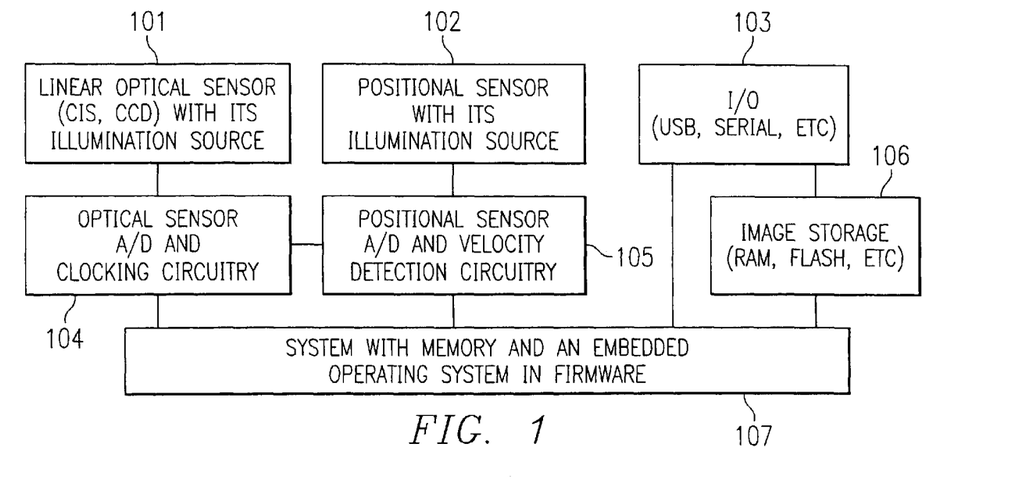
FIG. 1 is a high-level functional block diagram showing a preferred embodiment consistent with the teachings of the present invention.

Turning now to the figures, FIG. 1 is a high-level functional block diagram showing a preferred embodiment consistent with the teachings of the present invention. In block 101, the linear optical sensor may preferably be a CIS with LED illumination because of its compact size. Other sensing and illumination technologies may also be used to construct an embodiment of the invention. The optical sensor typically captures the image from the object being scanned. In block 102, the first function of the positional sensor is to preferably detect when an object is placed against it, signaling the linear optical sensor of block 101 to turn on its illumination source. The positional sensor may also preferably comprise a CIS. The second function of the positional sensor is to preferably capture a small area of image data, which, in some embodiments, may cover a square area about 12.7 millimeters (one half inch) on a side, and is used for preferably detecting features of the scanned object such as the grain of the paper to calculate the speed or velocity that the object is being "swiped."

A CIS-type optical scanner images an object by directing a beam of light reflected from the original object being scanned onto the array of photodetectors in a multi-segment linear optical sensor assembly. The image beam received by the multi-segment linear photosensor assembly corresponds to a currently imaged, narrow scan line portion of the object. The CIS multi-segment linear assembly generates data signals representing the currently imaged scan line portion of the object. The assembly continues generating data representing the successive scan lines of the object which are imaged thereon. The total collection of data from such scan lines represents an image of the entire original object.

It should be noted that in an alternative embodiment, other means of optical sensing, such as charge coupled devices (CCDs) with reduction optics and a linear illumination source may also preferably be used for both the linear optical sensor. CCDs are electronic memory made of a special type of metal-oxide-semiconductor (MOS) transistor, that can usually hold a variable charge. The charge, which may typically represent the variable shades of light through a camera lens, is typically an analog value that generally allows accurate photographic capture.

Additional types of imaging means that can be used to implement the present invention including gradient-index rod lenses, such as the SELFOC lenses from NSG America, Inc., which project an image on a full-length sensor. The imaging means may also employ reducing lenses for projecting an image on a sensor that is smaller than the full scanning width.

It should further be noted that optical sensors and methods for optically imaging, using such optical sensing arrays as CIS and CCD elements along with their corresponding illumination sources, are well-known in the art.

Referring again to FIG. 1, block 103 provides the interface to the host computer to transfer the image data from the image memory, block 106. In block 104, the support circuitry for the linear optical sensor array is provided, such as analog-to-digital (A/D) converter, element-to-element gain control, and clocking of the support circuitry. Block 105 provides the support circuitry for the positional sensor array to detect when an object has been placed against the plate. Block 105 also performs the calculations based on image data from the positional sensor array which indicates the velocity of the scanned object as it is "swiped" across the image sensor array. The signal that block 105 sends to block 104 preferably controls the exposure rate and duration of the CIS corresponding to its calculations of velocity. The signals from block 105 additionally cause block 104 to control the illumination intensity of the light source on block 101. In block 106, the image data that has been constructed from the CIS is stored in memory media. The memory media may preferably be non-volatile and removable such as PC Cards, Compact Flash (CF), SmartMedia (TM), Memory Stick (TM), multimedia cards, or other removable storage media. The image data will then preferably be stored in one or more selectable file formats similar to digital still images, such as joint photographic experts group (JPEG), tagged image file format (TIFF), graphics interchange format (GIF), and the like. The scanner system is managed, in block 107, by a system with local random access memory (RAM) and controlling firmware, preferably stored in read-only memory (ROM), erasable-programmable ROM (EPROM), electrically-erasable-programmable ROM (EEPROM), or other processor-accessible memory.

Figure 2:
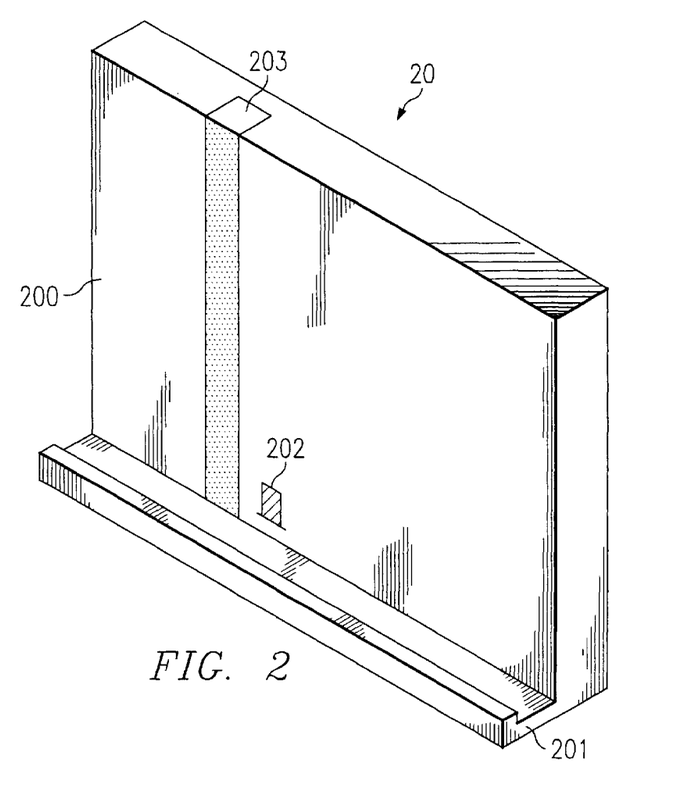
FIG. 2 is a perspective view illustrating a preferred embodiment of an optical imaging device according to the present invention.

FIG. 2 is a perspective view illustrating a preferred embodiment of an optical imaging device according to the present invention. Specifically swipe scanner 20 is illustrated for sake of example and comprises flat surface 200 and rail guide 201 which together preferably provide a restrictive surface for an original image or document to be placed against and manually slid to perform the scanning. Rail guide 201 assists the user in greatly restricting the motion of the swiped original to a single-axis direction. Swipe scanner 20 also includes motion detector 202 and image sensor 203 for reading image data from the swiped original. Motion detector 202 preferably detects when an original image has been placed against swipe scanner 20. When such an event occurs, image sensor 203 is activated to begin reading image data.

Motion detector 202 preferably reads a small area on the original image. The actual size of the area read by motion detector 202 will depend on the design choice made. A typical size, as previously mentioned, may be one-half of an inch square. However, depending on the design choice made other sizes, whether bigger or smaller may also preferably be used for motion detector 202. As a user swipes the original image across surface 200, motion detector 202 preferably reads the image data generated by smaller, characteristic points of the original, such as paper grain or small image features. Using this image data, motion detector 202 preferably calculates the velocities of the moving original. The resulting velocities are preferably used to set or determine the exposure timing for image sensor 203. Recall that, because a human user will typically cause the original to be swept across swipe scanner 20 with a variable velocity, a scanning process may produce variable pixel rates in the final copy without adjusting the exposure timing; such variable pixel rates would generally cause a poor quality or distorted copy. However, in order to compensate for the variable velocity of the original, and according to the present invention, the calculated velocities are preferably used to vary or adjust the exposure timing of image sensor 203. By adjusting the exposure timing, the scanning process of swipe scanner 20 preferably produces a more uniform pixel rate.

There are many possible methods for calculating the variable velocity of an original passed over motion detector 202. One such method uses technology described in the aforementioned, commonly-owned U.S. Pat. No. 5,578,813. The patent describes storing small images of the original object's features, such as paper grain or image contrast, as the sensing device moves over the original. The successively-stored images are then correlated to determine the displacements of the features. The patent describes this method for determining the positional reference of the scanned original. A velocity may then preferably be calculated using the determined displacements and a clock function within the scanner processing system.

Once the velocity has been calculated, the preferred embodiment of the present invention may adjust the exposure timing of image sensor 203. The relationship between the velocity and the exposure timing or sampling rate is preferably set according to the degree of resolution intended for the particular scanning device. For example, in a scanner according to the present invention manufactured to produce 600 dots per inch (dpi), the default exposure timing for image scanning may be programmed for an assumed constant default swiping speed, such as 0.45 meters/sec or other reasonable swiping velocity. If a user swipes faster than the default speed, the resulting image would effectively produce a scanned image with a resolution lower than 600 dpi because the timing had been set for a slower swipe speed. In a preferred embodiment of the present invention, the scanner will preferably shorten the time interval between exposures of imaging sensor 203 in order to maintain the 600 dpi resolution for a swipe speed faster than the contemplated default speed.

Conversely, if a user swipes more slowly that the default speed, the resulting scanned image would generally produce an image with a higher resolution than 600 dpi because the timing had been set for a faster swipe speed, i.e., more dots-per-inch would be scanned as the scanner moved more slowly over the original. In one embodiment of the present invention, the scanner may preferably lengthen the time interval between exposures of imaging sensor 203 in order to maintain the 600 dpi resolution for the slower swipe speed. In addition to adjusting the exposure time of image sensor 203, the scanner may also adjust the analog gain or image contrast sensitivity for any particular exposure to affect the quality of the imaged original. It should be noted that other scanners, manufactured to produce differing resolutions, such as 300 dpi, 800 dpi, and the like, would each preferably have comparable relationships between the default swipe speed, the actual swipe speed, and the exposure timing or sampling rate, in order to maintain the constancy of the scanning resolution during any variable swipe velocities.

Additionally, as the exposure timing is adjusted for image sensor 203, the intensity of the light sources within image sensor 203 is preferably adjusted to compensate for the lengthening and/or shortening of the exposure timing. It should be noted that the varying of the intensity has an effect on the power source for swipe scanner 20. As the exposure timing decreases with an increase of swipe velocity, the intensity of the light sources of image sensor 203 should preferably increase, which increases the power demand of swipe scanner 20. The light sources each have a limited maximum intensity after which either no appreciable increase in light is obtained and/or the light itself is weakened or completely burns out. Therefore, at some maximum swipe velocity, the scanning resolution may possibly decrease due to the limit of the light intensity being reached. Similarly, if swipe scanner 20 is moved very slowly, the light may reach a point at which the light it emits is insufficient to provide adequate exposure of image data. In order to avoid this problem, a minimum light intensity may be maintained after reducing the swipe speed below a certain point.

Figures 3, 4A:
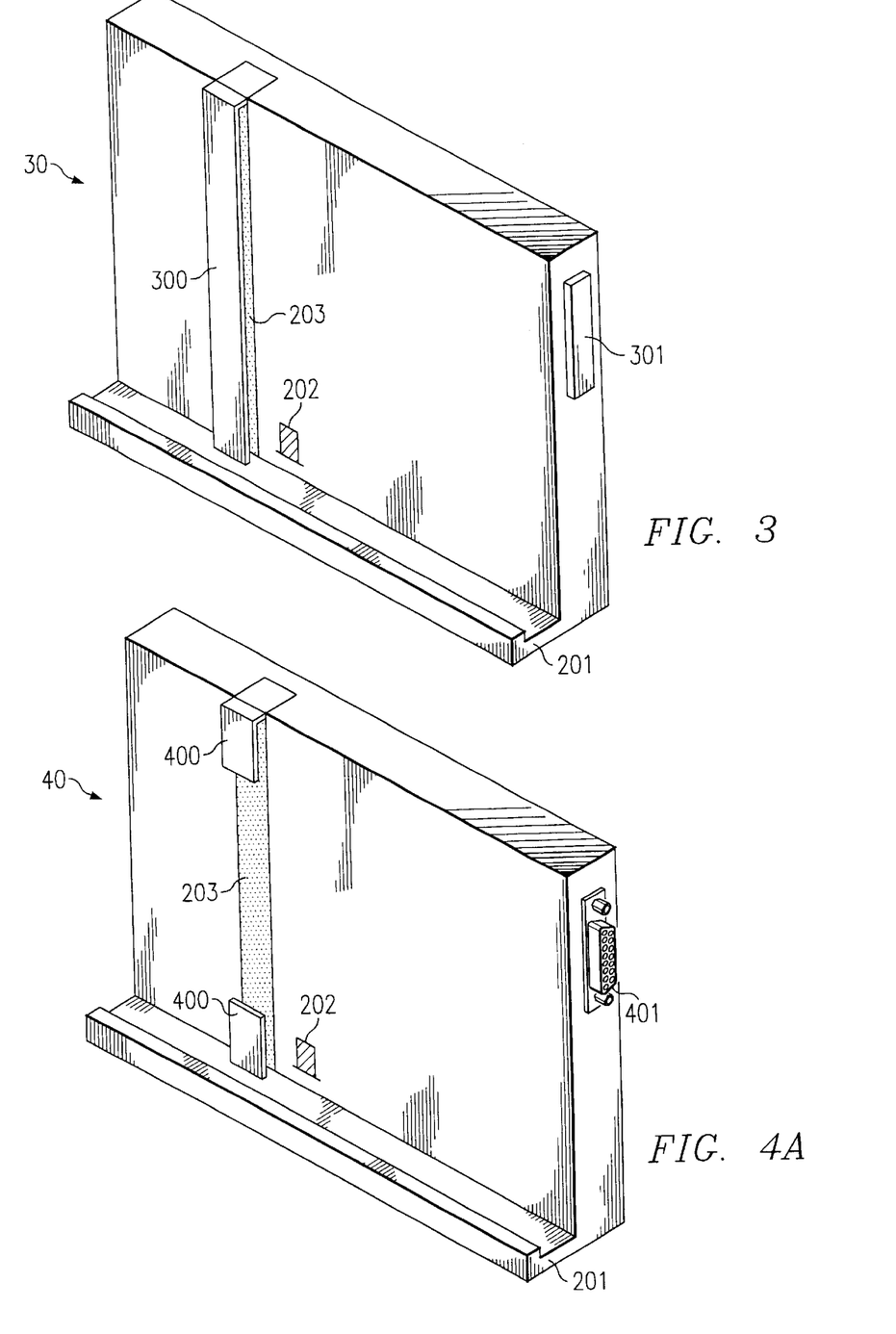
FIG. 3 is a perspective view illustrating an alternative preferred embodiment of an optical imaging device according to the present invention incorporating a full length friction guide.
FIG. 4A is a perspective view illustrating an alternative preferred embodiment of an optical imaging device according to the present invention incorporating friction guide clips.

Returning to the description of the FIGURES, on manually passing an original image over the scanning mechanism, it may be desirable to incorporate a securing, friction guide to assist holding the original image securely against the image sensor. FIG. 3 is a perspective view illustrating an alternative preferred embodiment of an optical imaging device according to the present invention incorporating a full length friction guide. Optical imaging device, such as optoelectric scanner 30, comprises the same basic parts as swipe scanner 20 from FIG. 2. Optoelectric scanner 30 preferably has rail guide 201 to assist in restricting the movement of an original image. It also has motion detector 202 and image sensor 203 for performing the scanning/copying functions of the present invention. Optoelectric scanner 30 also preferably incorporates friction guide 300 which spans the length of scanner 30 and is positioned directly opposite image scanner 203. As an original image is placed in rail guide 201, it is also slid underneath friction guide 300 to preferably secure the image against image sensor 203.

Friction guide 300 may comprise simply an elongated member of generally the same material as the body of optoelectric scanner 30. Friction guide 300 may also preferably comprise a more complicated unit with rotating wheels or rolling devices to press the original image against image sensor 203 without overly restricting the potential velocity of the original image being swept across scanner 30. Friction guide 300 may also comprise an elongated member incorporating an elastic substance in the area between friction guide 300 and image sensor 203 for lightly securing the original image against sensor 203 without overly restricting its motion or velocity.

FIG. 3 also shows removable memory 301. In the alternative preferred embodiment shown in FIG. 3, scanner 30 stores the copied image onto removable memory 301. A user may then preferably remove removable memory 301 to transport the copied image to another device capable of reading the stored image format.

Depending on the contemplated size of the original image, the friction guides may, instead, preferably comprise clips extending only partially down the length of the scanner. FIG. 4A is a perspective view illustrating an alternative preferred embodiment of an optical imaging device according to the present invention incorporating friction guide clips. FIG. 4A illustrates an alternative embodiment incorporating partially extended friction clips 400 to preferably secure the original image against image sensor 203. Optical imaging device 40 also preferably incorporates motion detector 202 and rail guide 201. As the original image is placed against scanner and motion detector 202, its edges are also inserted between friction clips 300 and image sensor 203 to preferably assist holding the original against sensor 203 during the sweeping motion.

FIG. 4A also illustrates connection port 401. Connection port 401 allows a user to directly connect optical imaging device 40 to another device, such as a general purpose computer, digital camera, printer, or the like. The resulting captured image may then be directly communicated to such other device through the connection.

Figure 4B:
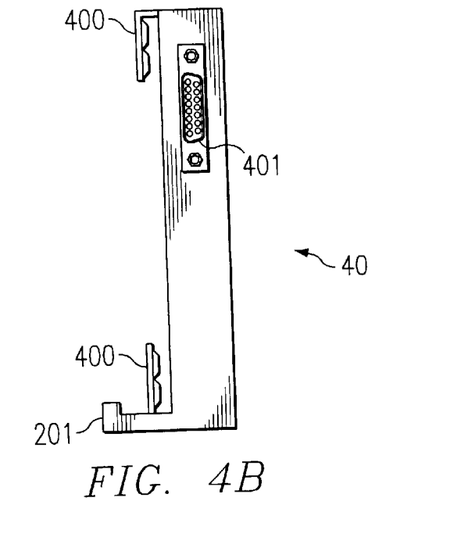
FIG. 4B is a perspective view illustrating a side-view of the alternative preferred embodiment of an optical imaging device according to the present invention illustrated in FIG. 4A.

FIG. 4B is a perspective view illustrating a side-view of the alternative preferred embodiment of an optical imaging device according to the present invention illustrated in FIG. 4A. As shown in FIG. 4B, friction clips 400 preferably protrude slightly from the surface of optical imaging device 40. The distance between friction clips 400 and optical imaging device 40's surface would preferably be determined by the type of original object or image contemplated for copying or scanning. The original object or image is placed between friction clips 400 and the surface of optical imaging device 40. As shown in FIG. 4A, friction clips 400 secure the original image directly over image sensor 203. The longer friction guide 300 of FIG. 3 may also preferably be configured in such a manner and such a distance from the surface of optoelectric scanner 30.

It should be noted that an alternative embodiment may preferably incorporate mechanical speed sensing devices into friction clips 400 (FIG. 4A) and/or friction guide 300 (FIG. 3) instead of requiring the processing by motion detector 202. By incorporating a mechanical sensor on a rolling device within friction clip 400 and/or friction guide 300, such as those used in a computer mouse or trackball, the mechanical sensors may preferably measure the speed of the original. In a further alternative embodiment including such mechanical speed sensors, motion detector 202 may be removed, with its functionality for activating image sensor 203 being transferred to the mechanical sensors or even to image sensor 203.

Figure 5:
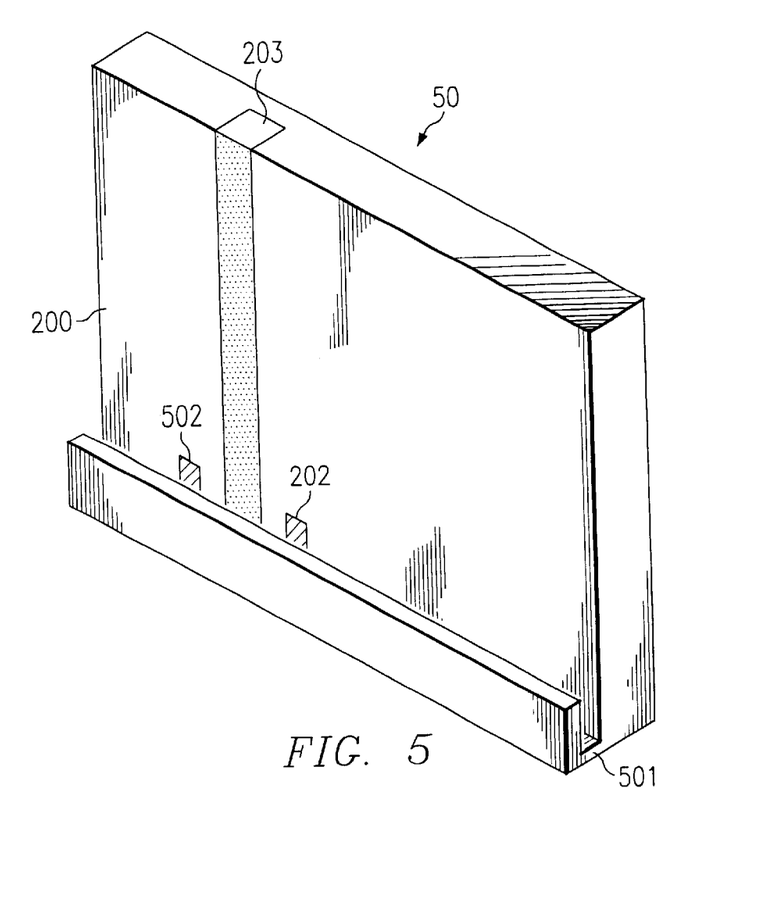
FIG. 5 is a perspective view illustrating an alternative embodiment of an optical imaging device according to the present invention incorporating a second, in-line motion detector.

FIG. 5 is a perspective view illustrating an alternative embodiment of an optical imaging device according to the present invention incorporating a second, in-line motion detector. Optical imaging device 50, in this case scanner 50, is equipped with flat surface 200, image sensor 203, motion detector 202, and second motion detector 502. The user begins the scanning process by placing an original against flat surface 200 and sliding one end of the original into slot 501 to provide directional stability. When the original is placed against either one of motion detector 202 or second motion detector 502, scanner 50 activates image sensor 203 in preparation for capturing the image of the original.

As the user slides the original through slot 501 and across image sensor 203, motion detector 202 detects the movement of image attributes or grains in order to calculate the speed that the user is sliding the original. As described above, the calculated speed is then used to adjust and vary the exposure timing and illumination intensity. When the front edge of the original reaches second motion detector 502, second motion detector 502 may preferably begin its own calculation of the original's velocity, which should be extremely close to, if not identical to the velocity calculated by motion detector 202. When the trailing edge of the original completely passes over motion detector 202, scanner 50 continues the image capture process using the velocities or speeds calculated by second motion detector 502. Therefore, scanner 50 does not lose any image data after the original completely passes motion detector 202. Additionally, the exposure timing and varying of the illumination intensity continues using the speed calculated by second motion detector 502.

Scanner 50 may continue scanning until the original is removed from the surface of second motion detector 502, or may continue scanning until the original is removed from the surface of image sensor 203. Any extra image data captured after the original passes completely over the image sensor 203 may thereafter be cropped from the final captured image using image manipulation software either resident on scanner 50 or on a general purpose computer or other device that has the captured image downloaded on it.

Figure 6:
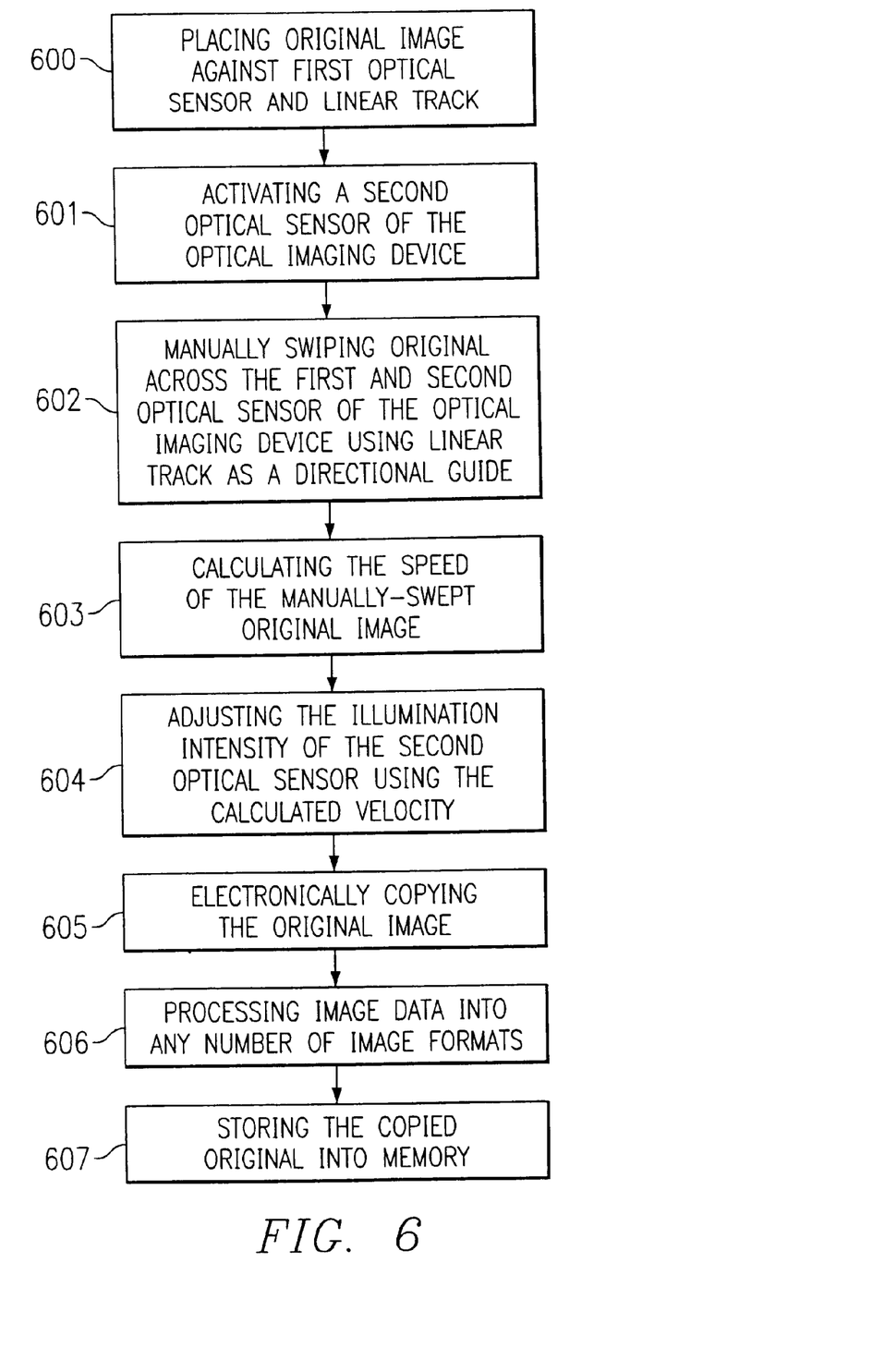
FIG. 6 is a flow chart illustrating preferred steps involved in implementing a preferred embodiment of the present invention.

FIG. 6 is a flow chart illustrating preferred steps involved in implementing a preferred embodiment of the present invention. In step 600, the original is preferably pressed against the back surface and down into the linear track. The first optical sensor preferably detects when the original object has been placed over it and responds by signaling for the second optical sensor's illumination source to turn on in step 601, thus activating the second optical sensor. As the object is slid, swiped, or passed by hand across the first and second optical sensors in step 602, the first optical sensor calculates the velocity and position of the original object, in step 603, as it moves across the second optical sensor. The first optical sensor uses the translational movement of features, such as the paper grain, to calculate the original's velocity. In step 604, the exposure timing and illumination intensity of the second optical sensor is then adjusted based on the velocity of the object as detected and calculated by the first optical sensor. The adjustment of the exposure timing occurs in real-time so that the original image is captured with a uniform number of pixels-per-distance that the original object is moved. The second optical sensor electronically copies the original image in step 605. In step 606, the optical imaging device preferably processes the copied image data into any number of image formats, such as JPEG, TIFF, GIF, or the like. The optical imaging device then stores the copied image in memory, in step 607.

In additional, preferred embodiments, the second optical sensor may also be deactivated by signals from the first optical sensor. When the original completely passes the first optical sensor, the optical imaging device could simply deactivate the second optical sensor, thus, concluding the imaging operation. However, such an embodiment may cause portions of the original not to be copied depending on the distance between the first and second optical sensors. In an alternative preferred embodiment, the optical imaging device would preferably use the calculated velocity of the original as the original completely passes the first optical sensor and the known distance between the first and second sensors to calculate a remaining time to keep the second optical sensor activated. This time calculation would preferably allow the user to continue swiping the original image over the second optical sensor until the end of the original is reached. In still other alternative preferred embodiments, a preset delay time may be incorporated into the operation of the optical imaging device to ensure that the entire original is copied by the second optical sensor. Any number of different delay schemes could be formulated to ensure this completion. The present invention is not limited to solely the methods referred to herein.

It should also be noted that alternative embodiments of the present invention may incorporate a means for a user to manually vary the exposure timing adjustment relationship with the calculated velocity in order to compensate for any deterioration of the image sensing arrays. In fact, further alternative embodiments may include "lighter" or "darker" selections enabling a user to adjust the image sensor response if the electrooptical copied images are not a satisfactory quality.

It should be noted that the optical imaging device of the present invention may preferably incorporate both removable memory as depicted in the embodiment shown in FIG.

3 and a connection port, as depicted in the embodiment shown in FIGS. 4A and 4B. The present invention is not limited to having either one or the other, or to having strictly internal memory. It should be noted that the optical imaging device of the present invention may preferably be fabricated to any number of varying sizes. In some embodiments, the optical imaging device may be sized to accommodate only small originals such as photographs or card-sized documents. Other alternative embodiments could preferably be fabricated large enough to accommodate letter, legal, A4, and other larger-sized paper stock or the larger pictures or photographs.

What is claimed is:

1. A hand-held optical imaging device comprising:
   an image sensor for reading image data from an original slid by a user over said image sensor;
   a variable power interface for varying an intensity of an illumination source corresponding to said image sensor, wherein said intensity is varied responsive to velocities of said original slid over said image sensor; and
   a processor for processing said image data.

2. The hand-held optical imaging device of claim 1 further comprising:
   a motion detector for calculating said velocities of said original.

3. The hand-held optical imaging device of claim 1 further comprising:
   a rail guide protruding along an edge of said device for restricting a dimension of movement of said original.

4. The hand-held optical imaging device of claim 3 wherein said rail guide is disposed substantially perpendicular to said image sensor.

5. The hand-held optical imaging device of claim 2 wherein said motion detector:
   activates said image sensor when said original is placed against said motion detector.

6. The hand-held optical imaging device of claim 1 further comprising
   a friction guide disposed adjacent from said image sensor for securely supporting said original against said image sensor while sliding said original across said image sensor.

7. The hand-held optical imaging device of claim 2 further comprising:
   a second motion detector for calculating velocities of said original slid over said second motion detector.

8. The hand-held optical image device of claim 1 wherein said motion detector captures an area of feature data for detecting surface features of said original for use in said velocity calculation.

9. The hand-held optical imaging device of claim 1 wherein said processor processes said image data into a portable digital image format.

10. A method of optoelectronically copying an original image comprising the steps of:
    passing said original image over a first optical sensor during said passing;
    calculating a speed of said original image;
    adjusting an exposure timing of said first optical sensor responsive to said calculated speed;
    varying an intensity of light sources associated with said first optical sensor; and
    electronically copying said original image using image data obtained by said first optical sensor.

11. The method of claim 10 further comprising:
    sliding said original image across a second optical sensor; and
    using position data obtained by said second optical sensor to perform said calculating step.

12. The method of claim 10 further comprising:
    using a linear track to restrict a direction of said original image during said sliding step.

13. The method of claim 11 further comprising:
    passing an end of said original image by said second optical sensor;
    calculating a remaining time using said calculated speed and a distance between said second optical sensor and said first optical sensor; and
    deactivating said first optical sensor after expiration of said remaining time.

14. The method of claim 10 wherein said electronically copying step comprises:
    processing said image data into an image format.

15. The method of claim 10 further comprising:
    slideably bracing said original image against said first optical sensor during said passing step.

16. An optical imaging device comprising:
    illumination means for providing illumination to an original to be scanned;
    imaging means for directing light reflected from said original to form an image on an image sensor;
    mounting means for holding said imaging means, said illumination means, and said image sensor in relationship for scanning;
    motion means for providing relative motion between said mounting means and said original;
    measurement means for measuring the speed of said relative motion; and
    light control means for varying an intensity of said illumination in response to variation in said speed while a user manually moves said original to be scanned over said optical imaging device.

17. The optical imaging device of claim 16 wherein said light control means increases said intensity when said speed increases, and decreases said intensity when said speed decreases.

18. The optical imaging device of claim 17 wherein said light control means varies said intensity substantially in direct proportion to said speed.

19. The optical imaging device of claim 16 further comprising:
    restriction means for restricting a motion of said original to substantially one dimension.

20. The optical imaging device of claim 16 further comprising:
    detection means for activating said illumination means by detecting a presence of said original.

21. A method of optoelectronically copying an image, comprising:
    moving said image over an optical sensor;
    calculating a velocity of the image over the optical sensor;
    using said velocity to adjust a sampling rate of the optical sensor; and
    using the velocity to adjust illumination to the image.

22. The method of claim 21 wherein a user performs the step of moving the image over the optical sensor.

23. The method of claim 21 wherein a user manually slides the image over said optical sensor.

* * * * *

UNITED STATES PATENT AND TRADEMARK OFFICE
CERTIFICATE OF CORRECTION

PATENT NO. : 6,646,244 B2
DATED : November 11, 2003
INVENTOR(S) : Eric Aas et al.

It is certified that error appears in the above-identified patent and that said Letters Patent is hereby corrected as shown below:

<u>Column 11,</u>
Lines 14, 24, 28, 32, 35, 36, 45, 49 and 53, delete "A hand-held" and insert therefor -- An --

Signed and Sealed this

Thirty-first Day of May, 2005

JON W. DUDAS
*Director of the United States Patent and Trademark Office*